US008281293B2

(12) United States Patent
Fulton et al.

(10) Patent No.: US 8,281,293 B2
(45) Date of Patent: Oct. 2, 2012

(54) COPY-ON-WRITE OPTIMIZATION OF IMMUTABLE OBJECTS FOR OBJECTS ORIENTED LANGUAGES

(75) Inventors: Mike Stephen Fulton, Maple Ridge (CA); Nikola Grcevski, Toronto (CA); Derek Bruce Inglis, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 11/782,148

(22) Filed: Jul. 24, 2007

(65) Prior Publication Data

US 2009/0031292 A1 Jan. 29, 2009

(51) Int. Cl.
*G06F 9/45* (2006.01)
*G06F 9/44* (2006.01)
*G06F 13/00* (2006.01)
*G06F 12/00* (2006.01)

(52) U.S. Cl. ........ 717/151; 717/153; 717/127; 711/163; 707/999.206

(58) Field of Classification Search ............... None
See application file for complete search history.

(56) References Cited

U.S. PATENT DOCUMENTS

| | | | | |
|---|---|---|---|---|
| 4,540,973 A * | 9/1985 | Grallert | | 341/76 |
| 5,940,850 A * | 8/1999 | Harish et al. | | 711/102 |
| 6,438,560 B1 * | 8/2002 | Loen | | 707/769 |
| 6,631,517 B1 * | 10/2003 | Lamping et al. | | 717/151 |
| 6,925,638 B1 | 8/2005 | Koved et al. | | |
| 6,931,423 B2 * | 8/2005 | Sexton et al. | | 1/1 |
| 7,043,493 B2 * | 5/2006 | Guthery | | 1/1 |
| 7,085,789 B1 * | 8/2006 | Tarditi | | 1/1 |
| 7,451,437 B2 * | 11/2008 | Ogasawara et al. | | 717/151 |
| 7,603,664 B2 * | 10/2009 | Dutt et al. | | 717/153 |
| 7,636,831 B1 * | 12/2009 | Subrahmanyam et al. | | 711/206 |
| 7,739,466 B2 * | 6/2010 | Rozas et al. | | 711/163 |
| 2003/0105772 A1 * | 6/2003 | Sexton et al. | | 707/103 R |
| 2003/0115227 A1 * | 6/2003 | Guthery | | 707/205 |
| 2005/0060694 A1 * | 3/2005 | Civlin | | 717/151 |
| 2006/0036656 A1 | 2/2006 | Mercer | | |
| 2006/0037003 A1 * | 2/2006 | Long et al. | | 717/127 |
| 2007/0143381 A1 * | 6/2007 | Kawachiya et al. | | 707/206 |

(Continued)

OTHER PUBLICATIONS

Haack, C., et al., Immutable Objects for a Java-like Language, Springer-Verlag Berlin Heidelberg, 2007, pp. 347-362, [retrieved on May 17, 2012], Retrieved from the Internet: <URL:http://www.springerlink.com/content/gg1951410qg635w0/fulltext.pdf>.*

(Continued)

*Primary Examiner* — Thuy Dao
*Assistant Examiner* — Geoffrey St Leger
(74) *Attorney, Agent, or Firm* — Yee & Associates, P.C.; David A. Mims, Jr.

(57) ABSTRACT

A computer implemented method, apparatus, and computer program product for copy-on-write optimization of immutable objects. An immutable object is marked as read-only to form a read-only object. The read-only object is formed to delay copying of the immutable object until a runtime determination is made that a write to the immutable object will be made. In response to an attempt to write to the read-only object, an internal value of the read-only object is copied to read-and-write storage using runtime information to form a writable copy of the read-only object. A set of references for the read-only object is updated to point to the writable copy of the read-only object. Delaying copying of the immutable object optimizes a copy-on-write of the immutable object.

19 Claims, 5 Drawing Sheets

U.S. PATENT DOCUMENTS

2008/0126740 A1* 5/2008 Wrighton et al. ............. 711/208

OTHER PUBLICATIONS

Cranor, C., et al., Zero-Copy Data Movement Mechanisms for UVM, Department of Computer Science, Washington University, 1999, 14 pages, [retrieved on May 17, 2012], Retrieved from the Internet: <URL: http://citeseerx.ist.psu.edu/index>.*

Aoyagi, "Reversible Functor: Immutable Aggregate with Constant Time Update Operation", IEICE Transactions on Information and Systems, vol. E79-D, No. 12, Dec. 1996, Abstract.

* cited by examiner

```
800 {
    public char[] get() {
        char[] buffer = new char[O.count];
        System.arraycopy(O.A, 0, buffer, 0, O.count);   /802
        return buffer;
    }
}
```

FIG. 8B

```
810 {
    public char[] get_specialised() {
        if (O.isStoredInReadOnlyStorage())   ~812
            return A;
        else
            return get();
    }
}
```

FIG. 9

```
900 {
    toCharArray_modified()
    {
        902 {  if (object_header_word & read_only_storage_mask)
               == 1 then
                   return value;
        904 {  else
                   return toCharArray()
    }
}

910 {   char buf[] = new char[str.length() ] ;
        str.getChars(0, buf.length, buf, 0) ;
```

COPY-ON-WRITE OPTIMIZATION OF IMMUTABLE OBJECTS FOR OBJECTS ORIENTED LANGUAGES

BACKGROUND OF THE INVENTION

1. Field of the Invention

The present invention is related generally to a data processing system and in particular to a method and apparatus for immutable objects. More particularly, the present invention is directed to a computer implemented method, apparatus, and computer usable program code for deferring copying of an internal value of an immutable object until it is highly probable that a change to the underlying data will be made.

2. Description of the Related Art

An immutable object is an object that cannot be written to or modified after it is created. An object can be entirely immutable or partially immutable. In other words, an object may have some attributes that are immutable and other attributes that are not immutable.

Many modern object oriented languages contain class library components or classes which are used to create immutable objects. Immutable objects' contents cannot be changed after the objects are created using the constructor methods defined in the class. There are several advantages and simplifications that immutable objects offer to program developers. For example, immutable objects are simple to construct, test, and use. Immutable objects are inherently thread-safe and have no synchronization issues. Immutable objects also do not require copy constructors when creating a new instance of the object.

If a process needs a copy of an immutable object, it is generally not necessary to create a new copy of the immutable object because the contents or internal values of the immutable object are never changed. Therefore, the process can make a copy of a reference to the immutable object rather than copying the immutable object itself. A reference to an immutable object is a pointer to the immutable object. In other words, the reference points to the original immutable object rather than making a copy of the immutable object. The reference to the object is usually much smaller than the object itself.

Making a copy of a reference to the object rather than copying the object itself results in saving memory and increasing execution speed and efficiency. The process of copying or creating a reference which points to the original or same object rather than copying the object is referred to as copy-on-write (COW). However, if any user were to change the original immutable object, any user of a reference to the original immutable object will see the changes. Therefore, if any user wants to modify the object through a particular reference, the copy-on-write process makes a real copy of the object and changes the reference to the original object to point to the new copy. In this manner, other users are unaffected by changes made to the copy of the object because the original immutable object and all references that still point to the original immutable object remain unaltered.

However, a significant downside to immutable objects is that any process that must access an internal value of an immutable object needs to make a copy of the internal value to ensure that the internal value is not inadvertently modified by the process, which is unnecessary if the internal value will only be used in a read-only manner.

SUMMARY OF THE INVENTION

The illustrative embodiments provide a computer implemented method, apparatus, and computer usable program code for copy-on-write optimization of immutable objects. In one embodiment, an immutable object is marked as a read-only to form a read-only object. The read-only object is formed to delay copying of the immutable object until a runtime determination is made that a write to the immutable object will be made. In response to an attempt to write to the read-only object, an internal value of the read-only object is copied to a read-and-write using runtime information to form a writable copy of the read-only object. A set of references for the read-only object is updated to point to the writable copy of the read-only object. Delaying copying of the immutable object optimizes a copy-on-write of the immutable object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
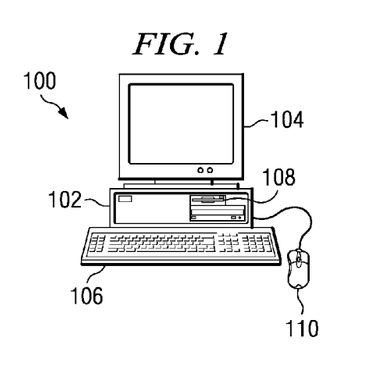
FIG. 1 is a pictorial representation of a network of data processing systems in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
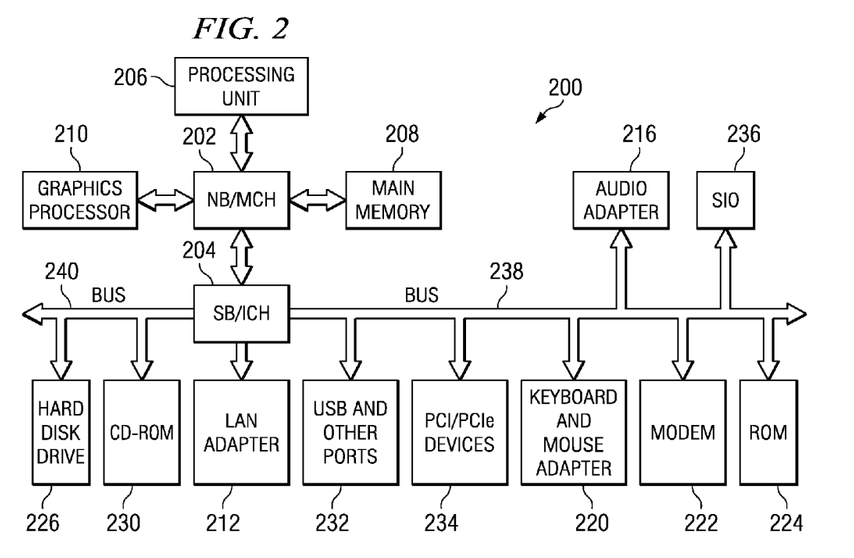
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. (Java and all Java-based trademarks are trademarks of Sun Microsystems, Inc. in the United States, other countries, or both.)

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In Java, some data members and objects, once created, are immutable. For example, string objects in Java tend to be immutable when created. As a result, the data inside an object or data member is frequently copied so that changes can be made to the underlying data while the original source object remains immutable or unchanged. However, when a process may only need to write to an internal value of an immutable object, the process of copying the entire immutable object can result in the loss of performance efficiency and speed during execution. In addition, immutable objects may be copied unnecessarily when a write to the object may never be made. Therefore, the illustrative embodiments recognize the need to defer the copying of internal values of immutable objects until it is certain or highly probable that there will be a change to the underlying data. The deferral typically results in performance benefits. Therefore, the illustrative embodiments provide a computer implemented method, apparatus, and computer usable program code for optimizing copy-on-writes of immutable objects. An immutable object is marked as a read-only to form a read-only immutable object. In one embodiment, the immutable object is marked as a read-only object by creating the immutable object in a read-only storage to form the read-only object.

In another embodiment, the immutable object is marked as read-only to form the read-only object by designating the pointers to the immutable object. In this example, a set of bits associated with the immutable object is set to start with an odd byte to form the read-only object and a set of bits associated with all read-write objects are set to start with an even byte to form writable objects. In this manner, the pointers to the immutable object are designated or identified.

In yet another embodiment, the immutable object is marked as read-only to form the read-only object by aligning the immutable object on a different boundary as read-write objects. In this example, a set of lower order bits associated with a set of references pointing to the immutable object is set to ones to form the read-only object.

The read-only object is formed to delay copying of the immutable object until a runtime determination is made that a write to the immutable object will be made. In response to an attempt to write to the read-only object, an internal value of the read-only object is copied to a read-and-write using runtime information to form a writable copy of the read-only object. A set of references for the read-only object is updated to point to the writable copy of the read-only object. Delaying copying of the immutable object optimizes a copy-on-write of the immutable object.

Thus, in accordance with the illustrative embodiments, the internal value of an immutable object is used by a process or other method until a write to the internal value is attempted. Only when the write is attempted is a copy of the internal value of the immutable object created. In this manner, copying of the internal value is avoided if the process or method never attempts to write to the internal value. In one embodiment, this optimization process is only applied to immutable objects which are expected to be used in a read-only manner. For example, string objects in Java are typically expected to be used in a read-only manner.

It will be appreciated by one skilled in the art that the words "optimize", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

The illustrative embodiments are described below as being implemented in a Java environment. However, the illustrative embodiments are not limited to implementation in Java. The illustrative embodiments may be applied in any computing system and/or environment with analogous capabilities. For example, the illustrative embodiments may be implemented in any programming language, including, but not limited to, Java, PHP: Hypertext Preprocessor (PHP), or any other language having a concept of immutable objects and garbage collection capabilities.

Figure 3:
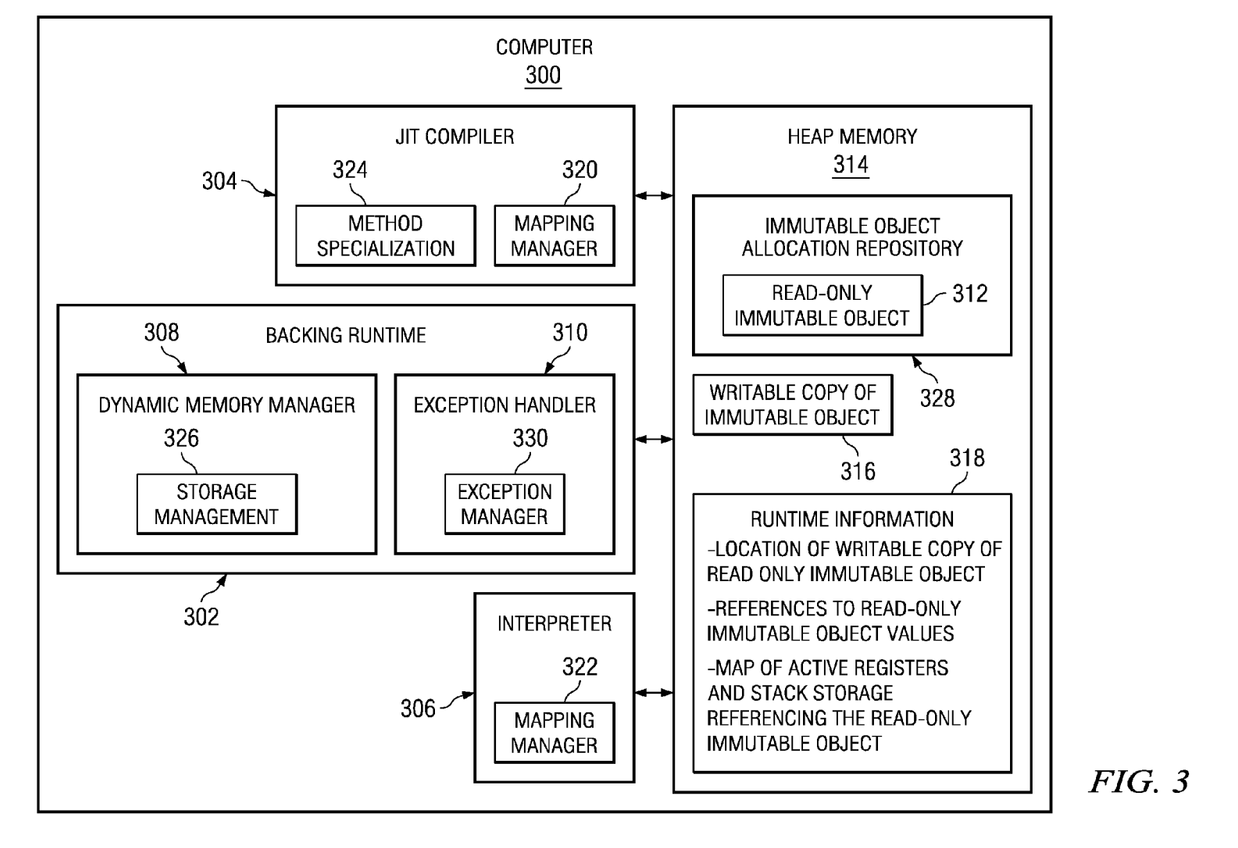
FIG. 3 is a block diagram illustrating exemplary execution components for optimizing copy-on-writes of immutable objects in accordance with an illustrative embodiment.

FIG. 3 is a block diagram illustrating exemplary execution components for optimizing copy-on-writes of immutable objects in accordance with an illustrative embodiment. Computer 300 may be implemented using any type of computing device, such as a personal computer, laptop, personal digital assistant, or any other computing device depicted in FIGS. 1 and 2. The illustrative embodiment in this example is implemented on an IBM J9™ virtual machine environment on computer 300. However, the illustrative embodiments are not limited to an IBM J9 environment.

Backing runtime 302 is a set of services used by just-in-time (JIT) compiler 304 and interpreter 306. JIT compiler 304 and interpreter 306 use the set of services provided by backing runtime 302 to operate.

JIT compiler 304 is a compiler for performing dynamic compilation or dynamic translation to improve the runtime performance of a computer program. JIT compiler 304 converts code from one format to another during runtime. For example, JIT compiler 304 can convert bytecode into native machine code.

Bytecode is a portable, binary representation of executable program code that is capable of being executed in a virtual machine. Bytecode may also be converted into native machine code at runtime by JIT compiler. Dynamic compilation of bytecode into machine code is generally faster than compilation of source code into machine code. This dynamic compilation also allows JIT compiler 304 to optimize compiled code using information known only at runtime. Because dynamic compilation compiles code as it is about to be executed, dynamic compilation is sometimes referred to as just-in-time (JIT) compilation.

Interpreter 306 is a software component that performs bytecode interpretation functions. Interpreter 306 compiles or interprets bytecode during execution rather than during a compilation phase prior to execution of the code. In this example, interpreter 306 is a Java interpreter. However, the illustrative embodiments are not limited to implementation in a Java interpreter. Any type of bytecode interpreter may be used in accordance with the illustrative embodiments.

Backing runtime 302 includes dynamic memory manager 308 and exception handler 310. Dynamic memory manager 308 is software for a garbage collection (GC) process. Dynamic memory manager 308 creates an immutable object in a read only storage to form read-only immutable object 312. In other words, read-only immutable object 312 is an object in heap memory 314 that has been set to read-only. A process or method may read internal values from read-only immutable object 312 but data cannot be written to read-only immutable object 312.

Exception handler 310 is an exception handling run-time software component for providing exception handling support. When a process or method attempts to write to read-only immutable object 312 an exception is created. Exception handler 310 responds to the exception.

In response to detecting an exception that indicates a write on read-only immutable object 312 is being attempted, exception handler 310 creates a writable copy of read-only immutable object 312. Exception handler 310 creates a writable copy of the internal value of read-only immutable object 312 required by the process or method to form writable copy 316 of immutable object 312. Exception handler 310 creates writable copy 316 of immutable object 312 using runtime information 318 provided by the compiled code.

The writable copy 316 of the internal value of read-only immutable object 312 can be modified or altered to form a modified internal value of read-only immutable object without affecting or altering original read-only immutable object 312. Any references to read-only immutable object 312 that will need to use the modified internal value of read-only immutable object created by modifying writable copy 316 of immutable object 312 are marked to form marked references. Exception handler 310 changes marked references to read-only immutable object 312 to point to writable copy 316 of immutable object 312.

Exception handler 310 will only update marked references for this particular section of code because all of the references in the entire application may not need a writable copy of immutable object 316 or any modified version of writable copy of immutable object 316.

Heap memory 314 is an area or pool of unused memory residing in main memory or primary memory. Memory in heap memory 314 may be allocated to objects. The size of memory allocated in heap memory 314 may be determined at runtime. Once a region of heap memory 314 has been allocated to an object, such as read-only immutable object 312, the object may be accessed indirectly by a process or method by using a reference to the object. A reference is another object that refers or points to the object containing data. In other words, the reference does not store the actual desired data itself but rather points to the object that does store the desired data.

The implementation of the optimization of copy-on-writes requires changes in runtime components, such as JIT compiler 304 and interpreter 306, so that these components are able to handle the changing state of the immutable objects.

For example, JIT compiler 304 includes mapping manager 320 and interpreter 306 includes mapping manager 322. Mapping manager 320 modifies JIT compiler 304 so that JIT compiler 304 can record information regarding the locations where read-only objects may be written into runtime information 318. Mapping manager 322 likewise modifies interpreter 306 so that interpreter 306 can record information regarding the locations where read-only objects may be written into runtime information 318.

Runtime information 318 describes the active state of the application or process at the point of writing to read-only immutable object 312. Runtime information 318 includes a map of active registers and stack storage referencing the object and/or pointers into read-only immutable object 312 and/or writable copy 316 of immutable object 312.

Exception handler 310 can copy read-only immutable object 312 to form writable copy 316 of immutable object 312 using runtime information 318 in the event that the write to read-only immutable object failed. Exception handler 310 then updates the active state of read-only immutable object 312 to point to the new object, which is writable copy 316 of immutable object 312. JIT compiler 304 also includes additional modification in the form of method specialization 324. Method specialization 324 is a software component for generating special case code for the methods that are used to retrieve the internal value of immutable objects. Method specialization 324 creates additional control-flow code, which decides whether the internal value of an immutable object will be externalized to form writable copy 316 of immutable object 312 or whether a full copy of read-only immutable object 312 will be performed. The decision of whether to externalize the internal value or whether a full copy will be made is made based on whether the immutable object is allocated in read-only memory on heap memory 314. If the immutable object is allocated in read-only storage, such as read-only immutable object 312, then method specialization 324 applies the optimization to the compiled code so that the internal value of read-only immutable object 312 will be externalized in accordance with the illustrative embodiments. If the immutable object resides in read-write storage, the default behavior will be used to copy the entire immutable object for modification by the user without optimizing the copy-on-write.

Dynamic memory manager 308 also requires modifications to implement the features of the illustrative embodiments. Dynamic memory manager 308 includes storage management 326. Storage management 326 is a software component for managing the immutable object read-only storage. The most efficient way to get read-only storage in heap memory 314 is to mark a set of pages in heap memory 314 as read-only. To achieve thread safe access to this read-only storage, storage management 326 performs storage management and creation during the garbage collection cycle.

The garbage collection cycle is a phase during which all executing threads are halted or frozen and memory in heap memory 314 is allocated or de-allocated, as necessary. Dynamic memory manager 308 is a garbage collection component that is augmented with storage management 326 component so that dynamic memory manager 308 can recognize immutable objects and allocate them in immutable object allocation repository 328 in heap memory 314.

Immutable object allocation repository 328 is a separate storage area in heap memory 314. At the start of a garbage collection cycle, immutable object allocation repository 328 is marked as read-write by storage management 326 of dynamic memory manager 308. Dynamic memory manager 308 allocates memory in immutable object allocation repository 328 for storing read-only immutable object 312. Dynamic memory manager 308 cleans up or de-allocates memory space to objects if they are unused.

If a newly allocated immutable object was allocated since the last garbage collection cycle and the immutable object is capable of optimization in accordance with the illustrative embodiments, the newly allocated immutable object is moved into immutable object allocation repository 328. Just before the garbage collection cycle ends, the pages of immutable object allocation repository 328 are marked as read-only. Any objects stored or moved into immutable object allocation repository 328 become read-only immutable objects, such as read-only immutable object 312. Immutable object allocation repository 328 may be allocated with size restrictions based off the current used maximum heap size.

Exception handler 310 also needs to be modified to recognize writes to read-only objects. Therefore, exception handler 310 includes exception manager 330. Exception manager 330 is a software component that recognizes writes to read-only objects. Exception manager 330 looks for runtime information 318 for an address that raised an exception after the exception is caught by exception handler 310. Exception manager 330 checks runtime information 318. Specifically, exception manager 330 checks the runtime address-range information created by JIT compiler 304 and interpreter 306 to verify that an attempt to write to a read-only storage was made.

If there is a read-only storage associated with the exception, exception handler 310 will copy the object into read-write storage in heap memory 314 to form writable copy 316 of immutable object 312. After the copy is performed, exception handler 310 replaces all references to read-only immutable object 312 with a reference to the newly created read-write value. In this example, the newly created read-write value is writable copy 316 of immutable object 312. The information about where references to the read-only value exist is provided by runtime information 318.

In accordance with this illustrative embodiment, dynamic memory manager 308 uses read-only storage in heap memory 314 for initial placement of immutable objects. Dynamic memory manager 308 allocates space in immutable object allocation repository 328 and moves an immutable object into that allocated space during a garbage collection cycle. At the end of the garbage collection cycle, dynamic memory manager 308 sets the pages associated with immutable object allocation repository 328 to read-only status. At this point, the immutable object stored in immutable object allocation repository 328 becomes read-only immutable object 312.

Dynamic memory manager 308 marks an appropriate bit in the header of the immutable object when the immutable object is moved to immutable object allocated repository 328. The bit in the immutable object header states that the object is now allocated in read-only storage. This bit is used by JIT-generated code to perform a fast check as to whether the internal value of the immutable object should be externalized.

When JIT compiler 304 generates code to write to a potentially read-only object, such as read-only immutable object 312, JIT compiler 304 creates a map describing the registers and the stack locations that are known to contain references to read-only immutable object 312 to form runtime information 318. JIT compiler 304 determines that a write to a read-only object may be made by checking the bit in the immutable object header. If the bit indicates that the immutable object is allocated in read-only storage, the immutable object is a read-only immutable object, such as read-only immutable object 312, and the copy-on-write can be optimized.

When a process or method attempts to write on read-only immutable object 312 in the read-only storage, an exception will be raised. The exception is caught or detected by exception handler 310. Exception handler 310 creates writable copy of immutable object 316 using runtime information 318. Writable copy of immutable object 316 is a copy of an internal value of read-only immutable object 312.

When interpreter 306 forms writable copy 316 of immutable object 312 and/or performs a write to writable copy 316 of immutable object 312, interpreter 306 provides a similar map describing the active stack and register values at the point of the write. The map provided by interpreter 306 is also saved as runtime information 318.

In this example, a bit in the immutable object header is marked to show that the object is allocated in read-only memory. A bit check is performed to determine if the object is a read-only immutable object. However, in another embodiment, if only one read-only area of memory is provided, an address-range check is performed in the code instead of the bit check. The bit check may be faster than the address range check. However, if a system does not have any spare bits in the object header, a user may prefer to use the address-range check instead.

In addition, if computer 300 contains special linkage components, the special linkage components may require modification. For example, an implementation of the Java-Native-Interface (JNI) system that passes objects with copy-in/copy-out on a JNI call would need to test if the object is read-only and perform special copying on return. This may be necessary because the page would normally be write-protected.

Figure 4:
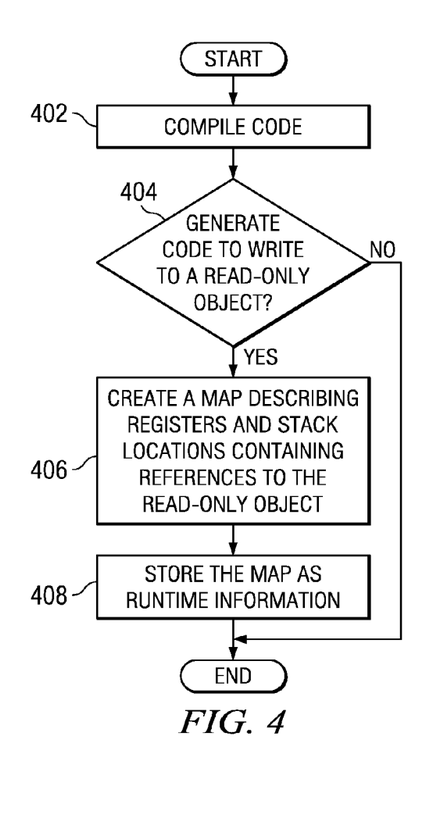
FIG. 4 is a flowchart illustrating a process for creating runtime information by a just-in-time compiler in accordance with an illustrative embodiment.

Turning now to FIG. 4, a flowchart illustrating a process for creating runtime information by a just-in-time compiler is shown in accordance with an illustrative embodiment. The process in FIG. 4 may be implemented by a dynamic compiler, such as JIT compiler 304 in FIG. 3.

The process begins by compiling code (step 402). The process makes a determination as to whether code is generated to write to a read-only immutable object (step 404). If code is not generated to write to a read-only immutable object, the process terminates thereafter.

Returning to step 404, if code is generated to write to a read-only immutable object, the process creates a map describing registers and stack locations containing references to the read-only immutable object (step 406). The process then stores the map as runtime information (step 408) with the process terminating thereafter.

Figure 5:
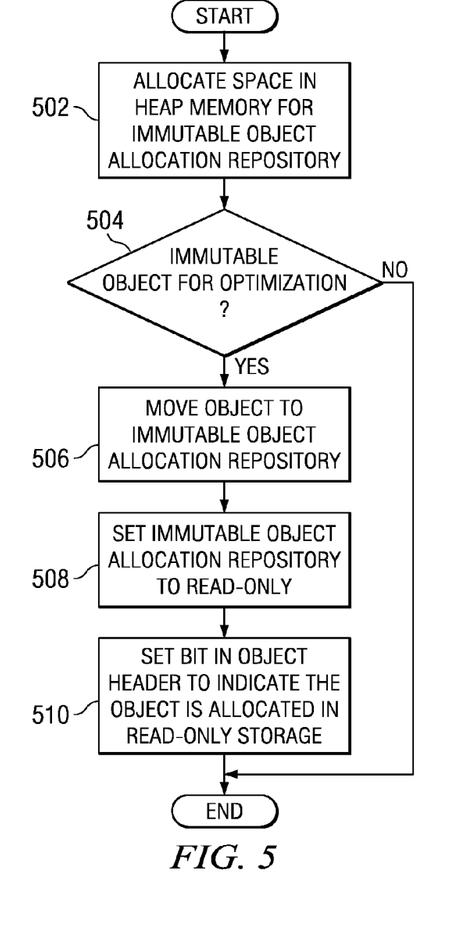
FIG. 5 is a flowchart illustrating a process for allocating read-only storage space of an immutable object in accordance with an illustrative embodiment.

Referring now to FIG. 5, a flowchart illustrating a process for allocating read-only storage space of an immutable object is shown in accordance with an illustrative embodiment. The process in FIG. 5 may be implemented by a dynamic memory manager, such as dynamic memory manager 308 in FIG. 3. The process may be performed during a garbage collection phase when execution of threads is suspended or halted.

The process begins by allocating space in heap memory for an immutable object allocation repository (step 502). The process makes a determination as to whether an immutable object is appropriate for optimization (step 504). An immutable object may be appropriate for optimization if it is generally accessed for read-only, such as a string object. If the immutable object is not appropriate for optimization, the process terminates thereafter.

Returning to step 504, if the immutable object is appropriate for optimization, the process moves the object to the immutable object allocation repository (step 506). The process sets the immutable object allocation repository to read-only status at the end of the garbage collection cycle (step 508). The process sets a bit in the object header for the immutable object to indicate that the object is allocated in read-only storage (step 510) with the process terminating thereafter. At this point, the object is a read-only immutable object in read-only storage.

Figure 6:
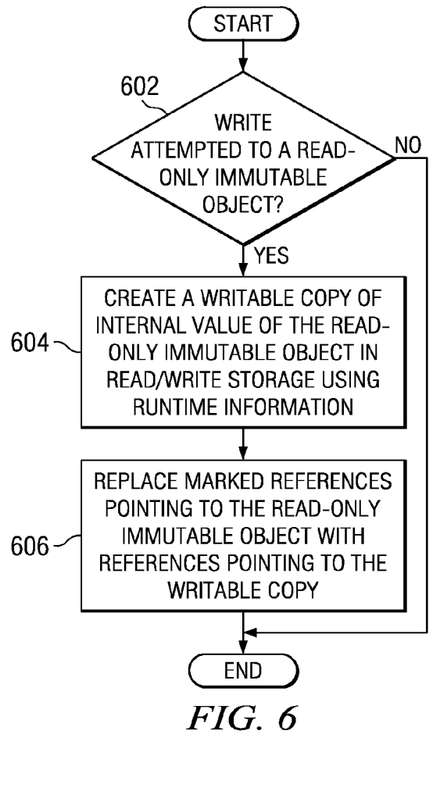
FIG. 6 is a flowchart illustrating a process for creating a writable copy of an internal value of a read-only immutable object in accordance with an illustrative embodiment.

FIG. 6 is a flowchart illustrating a process for creating a writable copy of an internal value of a read-only immutable object in accordance with an illustrative embodiment. The process in FIG. 6 may be implemented by an exception handling runtime component, such as exception handler 310 in FIG. 3.

The process begins by making a determination as to whether an attempt to write to a read-only immutable object is made (step 602). If an attempt to write to a read-only immutable object is not made, the process terminates thereafter.

Returning to step 602, if an attempt to write to a read-only immutable object is made, the process creates a writeable copy of the internal value of the read-only immutable object in a read and write storage using runtime information (step 604). The process then replaces all marked references pointing to the read-only immutable object with references pointing to the writable copy of the internal value of the read-only immutable object (step 606) with the process terminating thereafter. A marked reference is a reference that was marked to indicate that the reference should point to the writable copy of the internal value rather than pointing to the original read-only immutable object.

Figure 7:
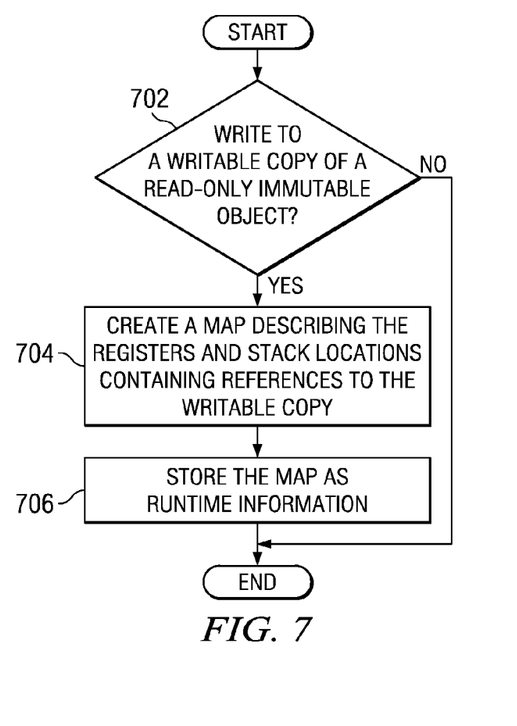
FIG. 7 is a flowchart illustrating a process for creating runtime information by an interpreter in accordance with an illustrative embodiment.

Turning now to FIG. 7, a flowchart illustrating a process for creating runtime information by an interpreter is depicted in accordance with an illustrative embodiment. The process in FIG. 7 may be implemented by an interpreter, such as interpreter 306 in FIG. 3.

The process begins by making a determination as to whether a write to a writable copy of an internal value of a read-only immutable object is being made (step 702). If a write is not being made, the process terminates thereafter.

Returning to step 702, if a write is being made, the process creates a map describing the registers and stack locations containing references to the writable copy of the internal value of the immutable object (step 704). The process stores the map as runtime information (step 706) with the process terminating thereafter.

Figure 8A:
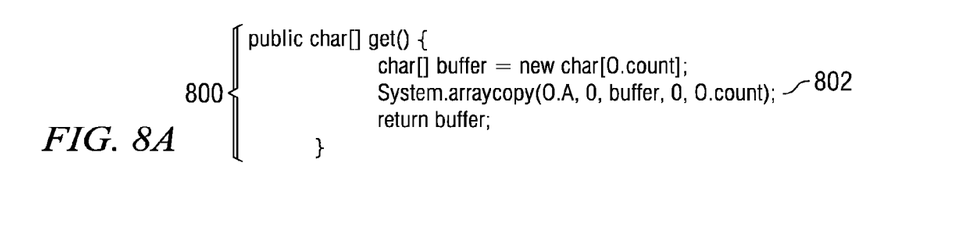
FIG. 8A is an exemplary illustration of Java™ code for copy-on-write optimization in accordance with an illustrative embodiment (Java and all Java-based trademarks are trademarks of Sun Microsystems, Inc. in the United States, other countries, or both)

An example of an immutable object whose external representation is used primarily in a read-only manner is the java.lang.String class. The java.lang.String internal character array is often used by the Java class libraries, rather than the java.lang.String object itself. Namely, all Java class library input/output (I/O) routines work on the character array. Almost without exception, the usage of the character array is read-only. The java.lang.String toCharArray( ) and getChars( ) methods are used to externalize the internal character array field of the object. An example is shown below in FIG. 8.

Turning now to FIG. 8A, an exemplary illustration of code for copy-on-write optimization is shown in accordance with an illustrative embodiment. Section of code 800 is an exemplary get( ) method in Java. In this example, an immutable object "O" contains an internal character array field "A" and method get( ). The get( ) method returns the internal contents of the array at line 802.

Figure 8B:
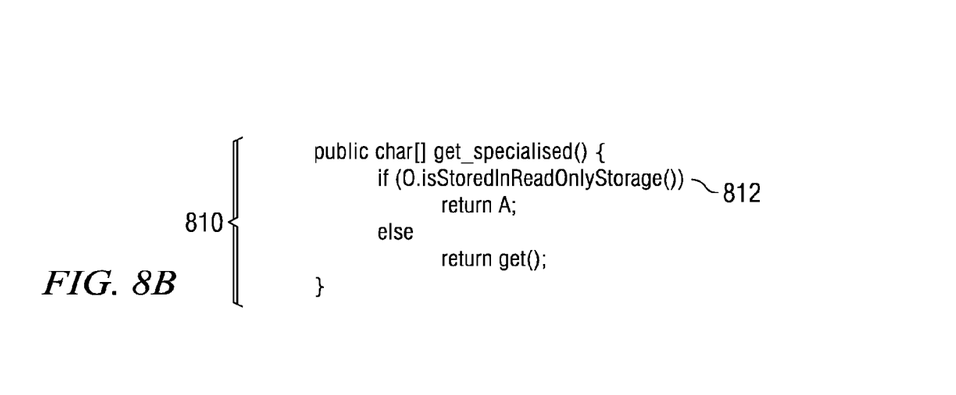
FIG. 8B is an exemplary illustration of specialized code for copy-on-write optimization is shown in accordance with an illustrative embodiment.

FIG. 8B is an exemplary illustration of specialized code for copy-on-write optimization is shown in accordance with an illustrative embodiment. After the method specialization component of the JIT compiler, such as method specialization 324 in FIG. 3, transforms the code according to the optimization, the specialized version of the get( ) method may look like the code in section 810. The implementation of the isStoredInReadOnlyStorage( ) method in line 812 can either use a bit "n" in the object header word to indicate that the immutable object is a read-only immutable object or the method can look at the address of the object to see if it resides in the read-only storage section of the heap memory, such as heap memory 314 in FIG. 3. Calls to get( ) are then replaced with calls to get_specialized( ) method. The get_specialized( ) method calls the original get( ) method in case the immutable object is not allocated in read-only storage.

In one illustrative embodiment just-in-time transformations are special cases to classes and methods that are understood to be immutable and known to provide a simple copy of a value. It is within the ability of one skilled in the art, once informed by the disclosure herein, to generalize this process so that the embodiments can detect, through pattern-matching, that a particular method returned a copy of a value and provide the transformation.

Figure 9:
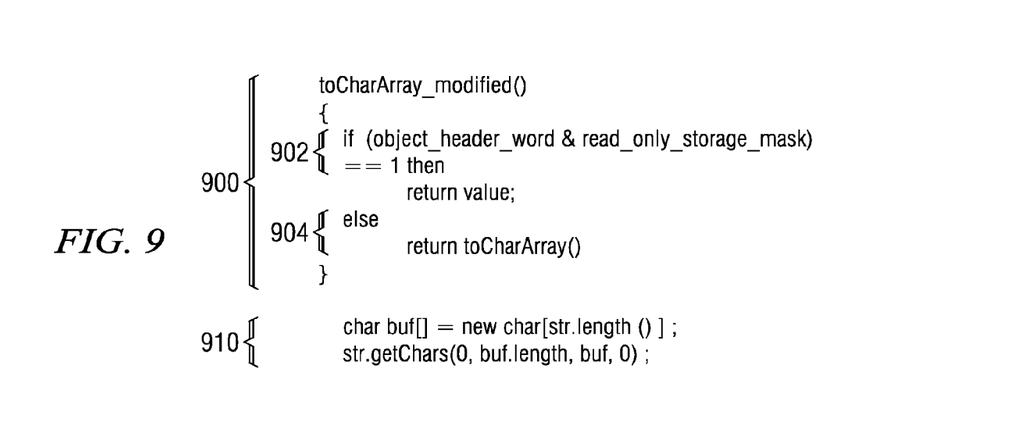
FIG. 9 is an exemplary illustration of pseudocode for copy-on-write optimization in accordance with an illustrative embodiment.

FIG. 9 is an exemplary illustration of pseudocode for copy-on-write optimization in accordance with an illustrative embodiment. Code section 900 is a more detailed pseudocode version of code 810 in FIG. 8. The JIT compiler will transform the java.lang.String toCharArray( ) method into specialized form which acts as a check for the String object residing in read-only memory. This bit check will be performed by a bit-mask operation on the garbage collector object header bit. If the JIT compiler determines that the read-only bit is set, the code will return a pointer to the internal character array field at code section 902. Otherwise, the original version of the toCharArray( ) method will be called at code section 904.

In the same sense, the JIT compiler detects use patterns of java.lang.String.getChars( ) which mimic the functionality of toCharArray( ) method and replace those with calls to java.lang.String.toCharArray( ). After the replacement, the same transformations can be applied, such as in the example shown in code section 910. The pseudocode in code section 910 is equivalent of doing tocharArray( ).

Thus, the illustrative embodiments provide a computer implemented method, apparatus, and computer usable program code for optimizing copy-on-writes of immutable objects. In one embodiment, an immutable object is created in a read-only storage to form a read-only object. The read-only object is formed to delay copying of the immutable object until a runtime determination is made that a write to the immutable object will be made. In response to an attempt to write to the read-only object, an internal value of the read-only object is copied using runtime information to form a writable copy of the read-only object. A set of references for the read-only object are updated to point to the writable copy of the read-only object. Delaying copying of the immutable object optimizes a copy-on-write of the immutable object.

The illustrative embodiments manipulate parts of immutable objects as read-only objects that are not copied until their first update. This optimization eliminates the need to copy objects if they are always referenced in a read-only manner, thereby reducing space and reducing path-length required to make copies of these objects. For classes provided by the system, such as string objects in Java, no changes are required by the user to benefit from this optimization.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for copy-on-writes of immutable objects of a class-based object-oriented language, the computer implemented method comprising:

marking an immutable object within a heap memory as read-only to form a read-only object, wherein the immutable object is marked as the read-only object within a garbage collection cycle of the class-based object-oriented language, wherein the immutable object is stored in read-only storage to form the read-only object to delay copying of the immutable object until a runtime determination is made that a write to the immutable object will be made, and wherein delaying copying of the immutable object optimizes a copy-on-write of the immutable object;

responsive to an attempt to write to the read-only object within the heap memory, copying an internal value of the read-only object to a read-and-write storage using runtime information to form a writable copy of the read-only object; and updating a set of references for the read-only object to point to the writable copy of the read-only object.

2. The computer implemented method of claim 1 further comprising:
checking a bit in a header of the immutable object to determine if the immutable object is a read-only object.

3. The computer implemented method of claim 1 further comprising:
checking a range of addresses of the immutable object to determine if the immutable object is a read-only object.

4. The computer implemented method of claim 1 further comprising:
creating a map describing registers and stack locations containing the set of references for the read-only object, wherein the map is stored to form runtime information.

5. The computer implemented method of claim 4 further comprising:
responsive to forming a writable copy of the read-only object, creating a second map describing registers and stack locations containing a second set of references for the writable copy of the read-only object; and
storing the second map to form the runtime information.

6. The computer implemented method of claim 1 wherein marking an immutable object to form a read-only object further comprises:
allocating space in a heap memory for an immutable object allocation repository;
moving the immutable object to the immutable object allocation repository; and
setting the immutable object allocation repository to a read-only status.

7. The computer implemented method of claim 1 wherein marking an immutable object as read-only to form a read-only object further comprises:
creating the immutable object in a read-only storage to form the read-only object.

8. The computer implemented method of claim 1 wherein marking an immutable object as read-only to form a read-only object further comprises:
setting a set of bits associated with the immutable object to start with an odd byte to form the read-only object and setting all read-write objects to start with an even byte to form writable objects.

9. The computer implemented method of claim 1 wherein marking an immutable object as read-only to form a read-only object further comprises:
setting a set of lower order bits associated with a set of references pointing to the immutable object to ones to form the read-only object.

10. A computer program product comprising:
a non-transitory computer usable medium including computer usable program code for copy-on-writes of immutable objects, said computer program product comprising:
computer usable program code for marking an immutable object within a heap memory as read-only to form a read-only object, wherein the immutable object is marked as the read-only object within a garbage collection cycle of the class-based object-oriented language, wherein the immutable object is stored in read-only storage to form the read-only object to delay copying of the immutable object until a runtime determination is made that a write to the immutable object will be made, and wherein delaying copying of the immutable object optimizes a copy-on-write of the immutable object;
computer usable program code for copying an internal value of the read-only object to a read-and-write storage using runtime information to form a writable copy of the read-only object in response to an attempt to write to the read-only object; and
computer usable program code for updating a set of references for the read-only object to point to the writable copy of the read-only object.

11. The computer program product of claim 10 further comprising:
computer usable program code for creating a map describing registers and stack locations containing the set of references for the read-only object.

12. The computer program product of claim 10 further comprising:
computer usable program code for allocating space in a heap memory for an immutable object allocation repository;
computer usable program code for moving the immutable object to the immutable object allocation repository; and
computer usable program code for setting the immutable object allocation repository to a read-only status.

13. An apparatus comprising:
a bus system;
a communications system coupled to the bus system;
a memory coupled to the bus system, wherein the memory includes computer usable program code; and
a processing unit connected to the bus system, wherein the processing unit executes the computer usable program code to mark an immutable object within a heap memory as read-only to form a read-only object, wherein the immutable object is marked as the read-only object within a garbage collection cycle of the class-based object-oriented language, wherein the immutable object is stored in read-only storage to form the read-only object to delay copying of the immutable object until a runtime determination is made that a write to the immutable object will be made, and wherein delaying copying of the immutable object optimizes a copy-on-write of the immutable object; copy an internal value of the read-only object to a read-and-write storage using runtime information to form a writable copy of the read-only object in response to an attempt to write to the read-only object; and update a set of references for the read-only object to point to the writable copy of the read-only object.

14. The apparatus of claim 13 wherein the processing unit further executes the computer usable program code to create a map describing registers and stack locations containing the set of references for the read-only object.

15. The apparatus of claim 13 wherein the processing unit executes the computer usable program code to allocate space in a heap memory for an immutable object allocation repository; move the immutable object to the immutable object allocation repository; and set the immutable object allocation repository to a read-only status.

16. A data processing system having a memory storing executable instructions for copy-on-writes of immutable objects, the system comprising:

a dynamic memory manager, wherein the dynamic memory manager marks an immutable object within a heap memory as read-only to form a read-only object, wherein the immutable object is marked as the read-only object within a garbage collection cycle of the class-based object-oriented language, wherein the immutable object is stored in read-only storage to form the read-only object to delay copying of the immutable object until a runtime determination is made that a write to the immutable object will be made, and wherein delaying copying of the immutable object optimizes a copy-on-write of the immutable object;

an exception handler, wherein the exception handler copies an internal value of the read-only object to a read-and-write storage using runtime information to form a writable copy of the read-only object in response to an attempt to write to the read-only object and updates a set of references for the read-only object to point to the writable copy of the read-only object.

17. The data processing system of claim 16 further comprising:

a just-in-time compiler, wherein the just-in-time compiler generates code to write to the read-only object and creates a map describing registers and stack locations containing the set of references for the read-only object, wherein the runtime information includes the map.

18. The data processing system of claim 16 further comprising:

an interpreter, wherein the interpreter creates a second map describing registers and stack locations containing a set of references to the writable copy of the read-only object in response to forming the writable copy of the read-only object.

19. The data processing system of claim 16 further comprising:

an immutable object allocation repository, wherein the immutable object allocation repository stores read-only immutable objects, and wherein an exception is generated in response to an attempt to write to any read-only immutable object in the immutable object allocation repository.

* * * * *